United States Patent
Shenoi (10) Patent No.: US 7,382,845 B1
(45) Date of Patent: Jun. 3, 2008

(54) DISTRIBUTION OF SYNCHRONIZATION IN AN ETHERNET LOCAL AREA NETWORK ENVIRONMENT

(75) Inventor: Kishan Shenoi, Saratoga, CA (US)

(73) Assignee: Symmetricom, Inc., San Jose, CA (US)

( * ) Notice: Subject to any disclaimer, the term of this patent is extended or adjusted under 35 U.S.C. 154(b) by 1057 days.

(21) Appl. No.: 10/320,312

(22) Filed: Dec. 16, 2002

Related U.S. Application Data (60) Provisional application No. 60/340,183, filed on Dec. 14, 2001.

(51) Int. Cl.
*H04L 7/02* (2006.01)

(52) U.S. Cl. ............... 375/361; 375/356; 375/359; 375/360; 375/364; 375/368

(58) Field of Classification Search ........... 375/356, 375/359–361, 364, 368, 371–376
See application file for complete search history.

(56) References Cited

U.S. PATENT DOCUMENTS

| | | | | |
|---|---|---|---|---|
| 4,949,051 A | * | 8/1990 | Viola | 331/11 |
| 4,953,185 A | * | 8/1990 | Goode | 375/354 |
| 5,052,022 A | * | 9/1991 | Nishita et al. | 375/215 |
| 5,272,700 A | * | 12/1993 | Hansen et al. | 370/480 |
| 5,452,115 A | * | 9/1995 | Tomioka | 398/75 |
| 5,633,872 A | * | 5/1997 | Dinkins | 370/312 |
| 6,178,161 B1 | * | 1/2001 | Terry | 370/276 |

\* cited by examiner

*Primary Examiner*—Curtis B. Odom
(74) *Attorney, Agent, or Firm*—Patterson & Sheridan, LLP (57) ABSTRACT

Systems and methods are described for distribution of synchronization in a packet switched local area network environment. A method for extracting network synchronization timing from a data transmission burst includes: recovering a clock during the data transmission burst; and then holding over the clock after the data transmission burst ceases. A method for inserting network synchronization timing into a data transmission burst includes encoding data using a time-base reference signal governed clock.

14 Claims, 4 Drawing Sheets

DISTRIBUTION OF SYNCHRONIZATION IN AN ETHERNET LOCAL AREA NETWORK ENVIRONMENT

CROSS-REFERENCES TO RELATED APPLICATIONS

This application is related to and claims a benefit of priority under 35 U.S.C. 119(e) and/or 35 U.S.C. 120 from U.S. Ser. No. 60/340,183, filed Dec. 14, 2001; U.S. Ser. No. 09/749,249, filed Dec. 26, 2000, which in-turn is related to U.S. Ser. No. 60/173,232, filed Dec. 28, 1999; and U.S. Ser. No. 09/993,302, filed Nov. 14, 2001, which in-turn is related to U.S. Ser. No. 60/272,413, filed Feb. 28, 2001 the entire contents of all of which are hereby expressly incorporated by reference for all purposes.

BACKGROUND OF THE INVENTION

1. Field of the Invention

The invention relates generally to the field of data networking. More particularly, the invention relates to distributing network synchronization timing in a packet switched local area network.

2. Discussion of the Related Art

The explosive growth of the Internet and the penchant for applying packetized transmission methods for all forms of information traffic has created the need for providing adequate synchronization down to the desk-top level. Inherently, packetized transmission schemes are not geared to transmit time-base information; packets enter the "cloud" and are carried over diverse routes to the destination where they may arrive out of order and with varying delays. In contrast, circuit-switched traffic maintains a given transmission path, the transmission delays are unknown but constant, and sequencing is maintained down to the bit level. Thus, in a packet-switched environment, there is the compelling need to provide synchronization at the entry/egress nodes of the "cloud"; in a general sense these are the "absolute" endpoints comprising desk-top PCs and other "Internet Appliances" (including, but not limited, to IP-ready telephones and IP-ready streaming video players/recorders).

The ubiquitous interconnection mechanism associated with Personal Computers (PCs), desktop workstations, etc., is Ethernet. Furthermore, the most common form of Ethernet deployed is over twisted pair cable, namely, 10BaseT and 100BaseT (the 10 and 100 refer to 10 Mbps and 100 Mbps, respectively). For specificity, we shall concentrate here on 10BaseT though extensions of the concepts to 100BaseT, other forms of Ethernet, and other forms of LANs, such as Token Ring, are quite straightforward.

Heretofore, the requirement(s) of providing adequate synchronization down to desk-top level referred to above has not been fully met. What is needed is a solution that addresses this requirement.

SUMMARY OF THE INVENTION

There is a need for the following aspects of the invention. Of course, the invention is not limited to these aspects.

According to an aspect of the invention, a process comprises: extracting network synchronization timing from a data transmission burst including: recovering a clock during the data transmission burst; and then holding over the clock after the data transmission burst ceases. According to another aspect of the invention, a process comprises: inserting network synchronization timing into a data transmission burst including encoding data using a time-base reference signal governed clock. According to another aspect of the invention, a machine comprises: a receive circuit; and a Manchester decoder state machine coupled to the receive circuitry, the Manchester decoder state machine including a clock recovery circuit, wherein the Manchester detector state machine includes a silence detection circuit that generates a data present signal that controls hold over of a time-base reference signal clock. According to another aspect of the invention, a machine comprises: a line driver circuit; a Manchester encoder coupled to the line driver circuitry; and an oscillator coupled to the Manchester encoder, wherein the oscillator is controlled by a time-base reference signal governed clock.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

The below-referenced patent applications disclose embodiments that are satisfactory for the purposes for which they are intended. The entire contents of U.S. patent application Ser. No. 09/749,249, filed Dec. 26, 2000 entitled "Clock Recovery and Detection of Rapid Phase Transients" (as well as U.S. Patent Application Ser. No. 60/173,232, filed Dec. 28, 1999); U.S. patent application Ser. No. 09/993, 302, filed Nov. 14, 2001 entitled "Measurement of Time-Delay, Time-Delay-Variation, and Cell Transfer Rate in ATM Networks" (as well as U.S. Patent Application Ser. No. 60/272,413, filed Feb. 28, 2001); and U.S. patent application Ser. No. 09/989,315, filed Nov. 20, 2001 entitled "Core Synch Module" are all hereby expressly incorporated herein by reference herein for all purposes. The entire contents of PCT/US00/35719, filed Dec. 27, 2000 (corresponding to 09/749,249) published on Jul. 5, 2001 as WO 01/48973; PCT/US02/06056, filed Feb. 28, 2002 (corresponding to 09/993,302) published on Sep. 6, 2002 as WO 02/06953; and PCT/US02/36985, filed Nov. 15, 2002 (corresponding to 09/989,315) are all hereby expressly incorporated herein by reference herein for all purposes.

In general, the context of the invention can include packet switched networking. The context of the invention can include Ethernet networking, especially Ethernet local area networks. The context of the invention can also include token-ring networking, especially token-ring local area networks.

Two representative LAN architectures are described here. It will be discerned that from the viewpoint of the distribution of synchronization they are closely related as are indeed all the other configurations that can be postulated. One configuration is representative of a residential or SOHO (Small Office Home Office) application. The other configuration is representative of an Office (commercial) application. In both cases, the node that interfaces with the WAN (Wide Area Network) is considered the synchronization source for the configuration for the sole reason that interconnections to the WAN are links into the Public Network where synchronization is carefully controlled and distributed and thus the WAN link can be used to derive an accurate time-base. Sometimes the WAN connection is not a good source of synchronization and in those cases the router (or server) that is highest in the synchronization hierarchy (a concept that is clarified shortly), typically the router connected to the WAN, derives timing from a separate synchronization source such as GPS (Global Positioning Satellite System) or CDMA (cellular telephony system based on Code Division Multiple Access) using equipment that is readily commercially available from Symmetricom Inc., 2300 Orchard Parkway, San Jose, Calif. 95131 www.symmetricom.com (e.g., the TS 2700 derives timing from CDMA, the TS 2500 derives timing from GPS).

Office Environment

Figure 1:
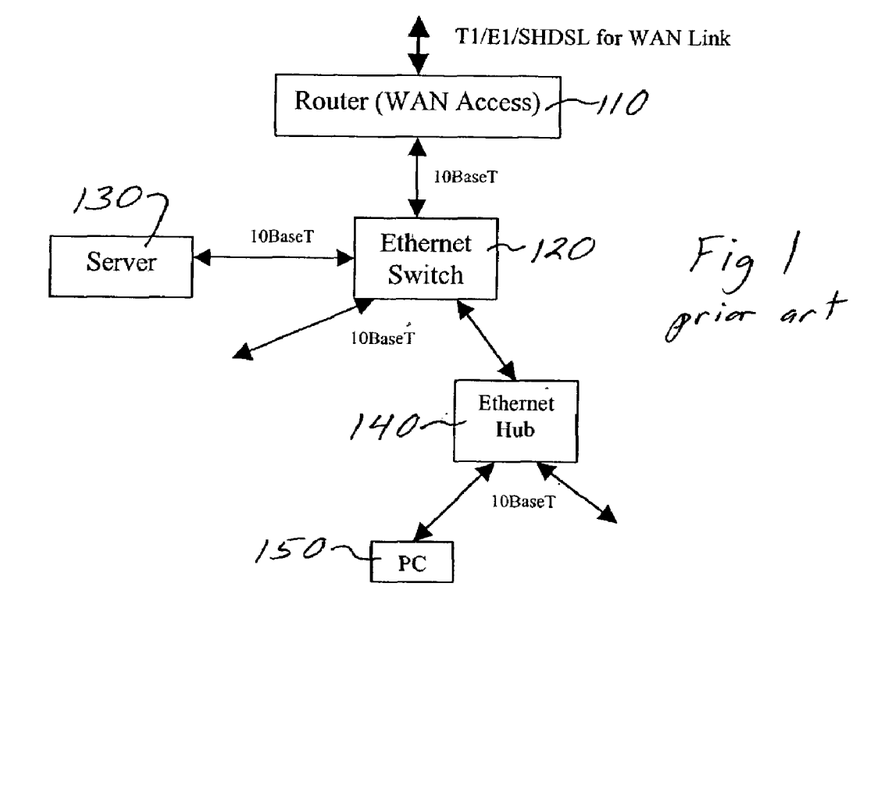
FIG. 1 illustrates a high level schematic view of a typical office local area network configuration, appropriately labeled "PRIOR ART."

Referring to FIG. 1, a typical office local area network configuration is depicted. A router 110 is coupled to a wide area network. An Ethernet switch 120 is coupled to the router 110. A server 130 is coupled to the Ethernet switch 120. An Ethernet hub 140 is also coupled to the Ethernet switch 120. A personal computer 150 is coupled to the Ethernet hub 140.

A typical office configuration would include a router that has a WAN connection in order to access the Public Internet. This WAN connection could take the form of a T1/E1 link or an SHDSL link. Other nodes in the LAN would be servers and clients (PCs and workstations). To reduce the complexities associated with control, maintenance, wiring, and so on, there would also be Ethernet switches and Ethernet hubs judiciously dispersed across the office. A typical situation is depicted in FIG. 1.

The router connected to the WAN is a logical node to assume the "master" position regarding time-base synchronization for the subtending LAN. This is because it is most likely that the WAN link can provide a time-base that is traceable to the Public Network. In the event that the link is unable to provide this time-base, then equipment such as the Symmetricom TS 2700 or TS2500 can be used to extract timing from the cellular telephone network (CDMA) or from the GPS satellite system, respectively. All well-conceived designs for communication equipment have an input port dedicated to "External Clock" and it is assumed that the "master" router (or server) for the LAN does have the means to accept timing. We coin the term LAN-Synch-Level-0 (Level-0 for short) for the master node. The master node is at the top (i.e. the highest) of the timing hierarchy.

The subtending equipment, the Ethernet switch in the example of FIG. 1, is a LAN-Synch-Level-1 node, indicating that it is one link away from the master. The switch must accept timing from the router and use this as a reference for all outgoing signals. The server and Ethernet hub, in the example depicted in FIG. 1, are LAN-Synch-Level-2 nodes, indicating that they are two links away from the master node. They accept timing from the LAN-Synch-Level-1 node they are connected to and use this as a reference for all outgoing transmission. The PC, in the example depicted in FIG. 1, is a LAN-Synch-Level-3 node, indicating it is three links away from the master. It accepts timing from the node one "higher" in the timing hierarchy to which it is connected. Depending on the complexity of the LAN, there may be many more levels in the timing hierarchy. It should be clear that the position of a node in the timing hierarchy is based on the attribute of how many links are present between the node in question and the master.

From an administrative standpoint, each node at Level-N accepts timing from one designated node at Level-(N−1) and uses this as the reference for all outgoing transmissions. The PC (or "client", or "Internet Appliance") is usually at the lowest level in the hierarchy (largest value for N). What if a node at Level-N has connections with two nodes at Level-(N−1)? Whereas this is an unlikely scenario in a LAN environment that is easily configured to be strictly hierarchical, two options are available. One is purely administrative and comprises designating one as the timing source. Properly designed equipment will allow such a choice. In some cases, the equipment design may allow for designating one as the "primary" and another as the "back-up" and will switch to the back-up in the event of a failure condition in the primary. The second option is to use the method developed by George Zampetti of Symmetricom, described in U.S. patent application Ser. No. 09/989,315, filed Nov. 20, 2001 entitled "Core Synch Module" and referred to as "BesTime", whereby the equipment accepts multiple references and BesTime achieves the appropriate "average" and disqualifies references that are out of tolerance. The need for administrative control over which input to use as reference is necessary to avoid "timing loops".

The methodology for extracting timing and using this as a reference for outputs (and any other functions that need an accurate time-base) is discussed later. However, it should be evident that by using such an architecture for distributing time-base synchronization, all nodes in a LAN have a time-base that is traceable to the master node and thus, in turn, traceable to an accurate reference (the Public Network or an equivalent such as GPS). In particular, every client node (PC or Internet Appliance) can perform its timing based functions based on a clock that is accurate in an absolute sense. When properly deployed, two end nodes of a packet-switched link can process signals (such as voice or video, etc.) using essentially the same time-base (clock frequency) relieving the packet-switched network from the burden of transporting clocking particulars along with the actual information (voice or video, etc.).

Residential or SOHO Environment

Figure 2:
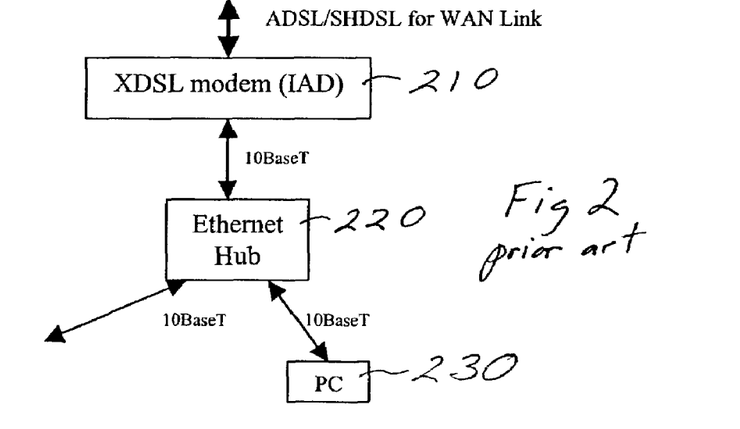
FIG. 2 illustrates a high level schematic view of a typical residential small office home office local area network configuration, appropriately labeled "PRIOR ART."

Referring to FIG. 2, a typical residential/SOHO local area network configuration is depicted. An XDSL modem 210 is coupled to a wide area network. An Ethernet hub 220 is coupled to the XDSL modem 210. A personal computer 230 is coupled to the Ethernet hub 220.

A typical residential or SOHO configuration would include a DSL modem (or Integrated Access Device, LAD) with a built in router for the WAN connection in order to access the Public Internet and other services (in the case of IADs). This WAN connection could take the form of an ADSL or an SHDSL link. Other nodes in the "LAN" would typically be clients (PCs and Internet Appliances). If there are multiple nodes then Ethernet hubs may be deployed and, conceivably, these hubs may be integrated into the modem (or LAD). A typical situation is depicted in FIG. 2.

The xDSL modem (LAD) is considered a router connected to the WAN and is the logical node to assume the "master" role for the residential/SOHO LAN. In all other respects, the situation is the same as that for an Office configuration, albeit on a smaller scale.

The methodology for extracting timing and using this as a reference for outputs (and any other functions that need an accurate time-base) is discussed later. However, it should be evident that by using such an architecture for distributing time-base synchronization, all nodes in a LAN have a time-base that is traceable to the master node and thus, in turn, traceable to an accurate reference (from the Public Network). In particular, every client node (PC or Internet Appliance) can perform its timing based functions based on a clock that is accurate in an absolute sense. When properly deployed, two end nodes of a packet-switched link can process signals (such as voice or video, etc.) using essentially the same time-base (clock frequency) relieving the packet-switched network from the burden of transporting clocking particulars along with the actual information (voice or video, etc.).

Ethernet and IEEE Std 802.3

Ethernet technology was invented over 30 years ago and has since been refined and extended. The most prevalent form of the technology follows the standard IEEE Std 802.3 which has also been adopted by international bodies as ISO/IEC 8802-3:2000(E) ( where 2000 refers to the year 2000, corresponding to the most recent publication). Whereas there are minor differences between the different forms (e.g. Ethernet versus IEEE 802.3), these differences are quite irrelevant from the viewpoint of time-base insertion and recovery. Consequently we shall refer to all forms as simply Ethernet.

Ethernet transmission is accomplished in bursts. In the case of 10BaseT, the underlying bit-rate (during a burst) is 10 Mbps and the standard allows a 0.01% deviation from this rate; i.e., the underlying clock frequency must be accurate to within 100 ppm (parts per million). The corresponding fractional frequency offset is $10^4$. For the purposes of this discussion, the format of the burst can be portrayed as in FIG. 3.

Figure 3:
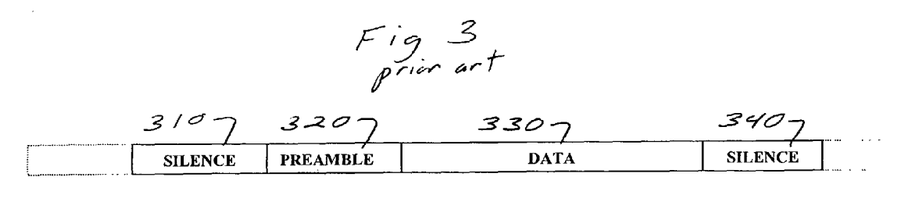
FIG. 3 illustrates the basic format of an Ethernet transmission burst, appropriately labeled "PRIOR ART."

Referring to FIG. 3, a basic format of an Ethernet transmission burst is depicted. A time period of silence 310 is followed by a preamble time period 320. The preamble time period 320 is followed by a data time period 330 and then by another period of silence 340.

Binary data (bits) are transmitted using a Manchester-encoded technique. Thus the transmitted unit for a binary 0 is called "CD0" (for clocked data 0) and likewise for a binary 1 is referred to as "CD1". Manchester encoding is especially robust since it is a "self-clocking" scheme with an abundance of transitions to aid in clock recovery. In Manchester encoding, each bit-time (100 nsec in the case of 10 Mbps transmission) is split into two halves. For sending CD0, the first half is "high" and the second "low", implying the presence of a high-to-low transition in the middle of the bit-time. In the case of CD1, the first half is "low" and the second half "high", corresponding to a low-to-high transition in the middle of the bit-time. The identity of a bit (1 or 0) can be obtained by sampling the signal at the end of the bit-time. The notion of silence is the absence of transitions.

The preamble is a special pattern. In particular, the preamble comprises—56 bits of alternating 1s and 0s. From a transmission standpoint this corresponds to an alternating pattern of . . . , CD1, CD0, CD1, CD0, . . . which appears as a square-wave pattern of frequency corresponding to half the bit-rate (5 MHz for 10BaseT). The last bit prior to data is CD0. The intent of the preamble is to allow the receiver to achieve bit-time synchronization for the purposes of data extraction.

Figure 4:
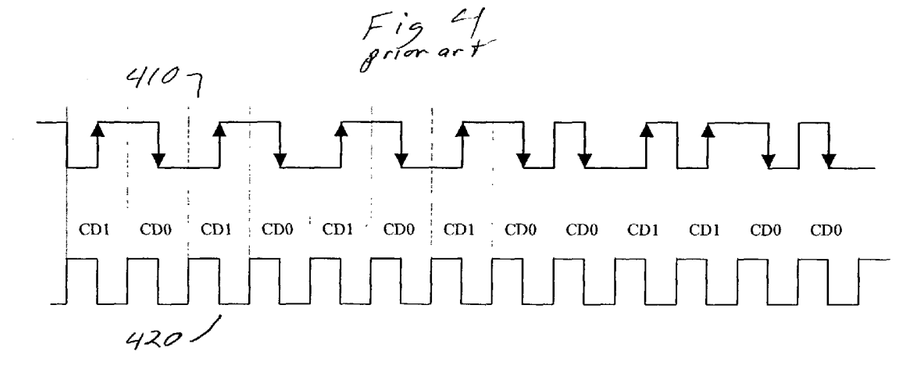
FIG. 4 illustrates a Manchester-encoded signal and an associated (recovered) clock, appropriately labeled "PRIOR ART."

For purposes of illustration, a typical waveform of Manchester-encoded bits is depicted in FIG. 4. Referring to FIG. 4, a Manchester-encoded signal 410 and associated (recovered) clock 420 are illustrated together in time domain. The corresponding bit states are also shown.

The abundance of edges is evident. The pattern chosen includes some alternating CD1/CD0 bits to illustrate the nature of the preamble as a square wave of 5 MHz (in the case of 10BaseT). Also shown in FIG. 4 is a typical recovered clock signal that has been depicted as having rising edges at the bit-time boundaries.

Timing Insertion and Recovery

In order to transmit time-base information over a 10BaseT link, a method to insert timing is necessary. Secondly, a method to extract the timing information at the receiver is required. Thirdly, a method to use this timing information, given that the transmissions are burst-mode, must be developed. In the following sections these three aspects of timing insertion, recovery, and use, are discussed.

Timing Insertion

Figure 5:
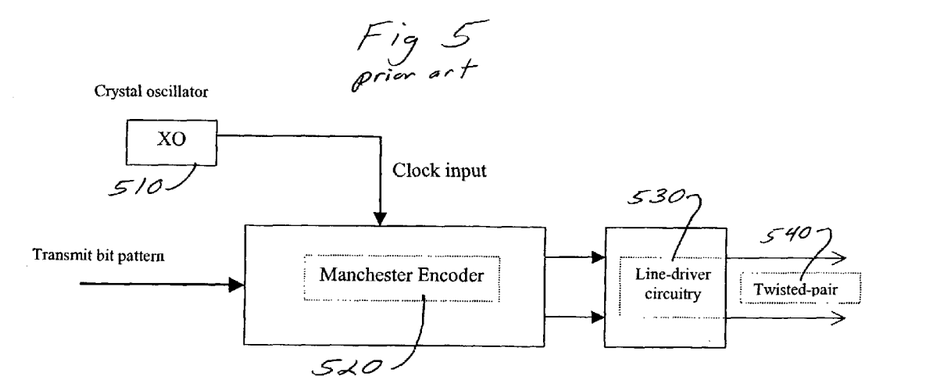
FIG. 5 illustrates a block schematic view of a transmit section of a conventional 10BaseT transceiver, appropriately labeled "PRIOR ART."

Timing insertion can involve a modification to existing Ethernet (802.3) 10BaseT transmitters. In FIG. 5 a simple functional diagram of a conventional 10BaseT transmitter is depicted.

Referring to FIG. 5, a block diagram of the transmit section of a conventional 10BaseT transceiver is depicted. A crystal oscillator 510 provides a clock input to a Manchester encoder 520. A transmit bit pattern is encoded by the Manchester encoder 520 and conveyed to line-driver circuitry 530. A twisted pair cable 540 is coupled to the line-driver circuitry 530.

The key functional block is shown as circuitry that accepts the transmit bit pattern, performs the Manchester encoding; needless to say, there is appropriate (analog) circuitry to drive the twisted pair cable. The circuitry derives its timing from an oscillator, typically a crystal oscillator, shown as "XO" in FIG. 5. The key is that the signal edges (bit-time boundaries and mid-bit transitions) associated with the Manchester encoded bit stream are tied to the clock input that is driven by the oscillator. In an actual implementation, the signal path for clocking information may not go directly from the oscillator to the transmit section as shown. The transmit section will be but one circuit block within a larger integrated circuit that contains other functional blocks (such as the receiver, for example).

It is essential to recognize that all conventional 10BaseT transceivers deployed today use a free-running crystal oscillator with an accuracy of (better than) 100 ppm. The advantages associated with synchronizing the time-base to a (given) reference have not been recognized.

Introducing time-base information into the output is quite straightforward. Rather than use a free-running crystal oscillator, a phase-locked-loop (PLL) using a VCXO (voltage controlled crystal oscillator) is deployed. The reference signal that governs the insertion of time-base is used to control the PLL (used as the reference input to the PLL) as shown in FIG. 6.

Figure 6:
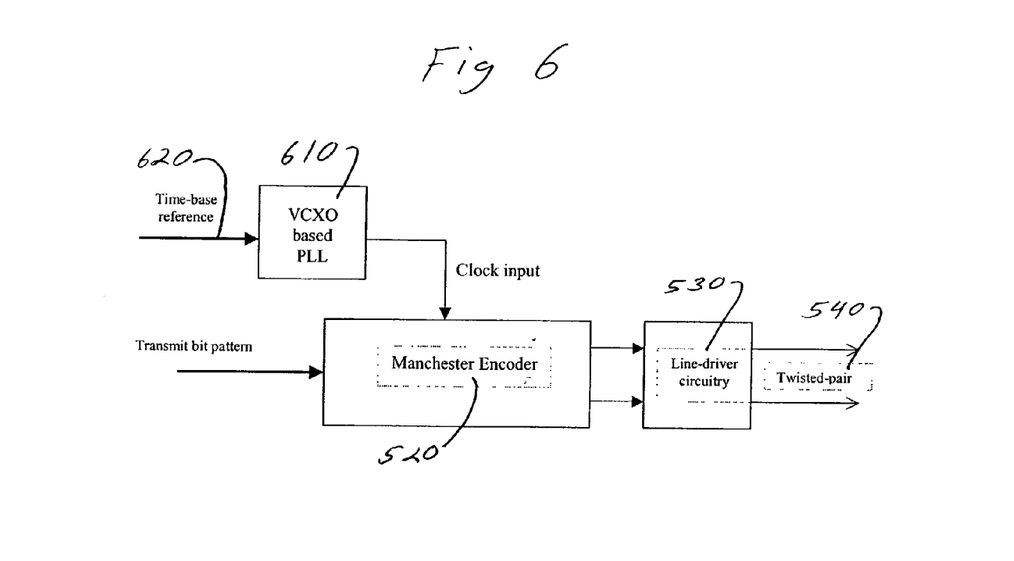
FIG. 6 illustrates a block schematic view of a transmit section of a 10BaseT transceiver with time-base insertion, representing an embodiment of the invention.

Referring to FIG. 6, a block diagram of the transmit section of a 10BaseT transceiver with time-base insertion is depicted. A voltage controlled crystal oscillator based phase lock loop 610 is coupled to the Manchester Encoder 520. The voltage controlled crystal oscillator based phase lock loop 610 is controlled by a time-base reference signal 620.

It is essential to recognize that the frequency generated by the PLL can be the same as for the conventional arrangement and thus the circuitry associated with the Transceiver chip does not have to be modified in order to insert timing information. It suffices that the clock source used, free-running in the case of the conventional arrangement, is modified so that it is locked to the chosen reference. The output of the PLL is a clock signal that is traceable to the time-base reference and can also be distributed within the node for any other time-base critical functions. In some cases the PLL that locks to the time-base reference may be separate and the VCXO based PLL depicted in FIG. 6 may take the output of that PLL to discipline a VCXO to generate the specific frequency required by the Manchester encoder. In all cases, the clock provided to the Manchester encoder is traceable to the time-base reference provided to the node, either via external means or via a recovered time-base from an incoming Ethernet signal.

Timing Recovery

Manchester-encoded data has an abundance of transitions when data is actually being transmitted and no transitions during "silence". The preamble of alternating 1/0 data bits (—56 bits as specified in IEEE Std 802.3) serves as means to ensure that the receiver can accurately synchronize itself to extract actual information bits that follow the preamble. The functional elements of a Manchester receiver are depicted in FIG. 7.

Figure 7:
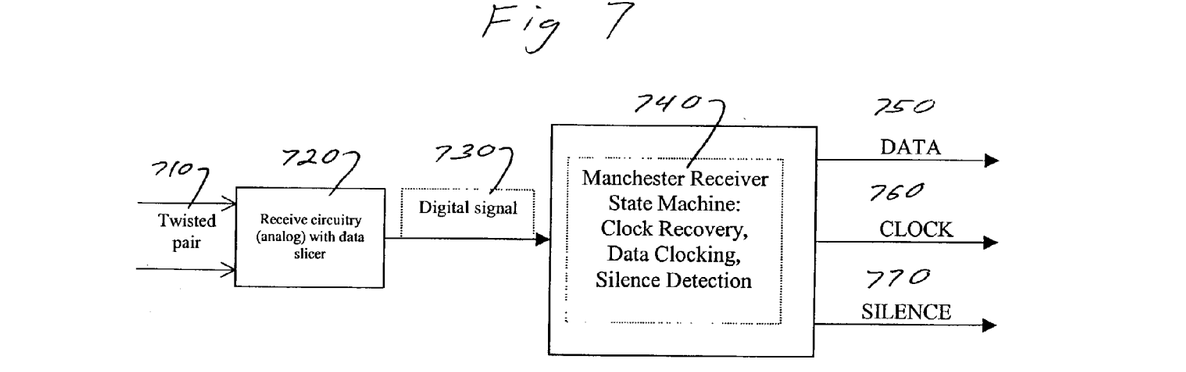
FIG. 7 illustrates a block schematic view of a Manchester receiver state machine, representing an embodiment of the invention.

Referring to FIG. 7, a block diagram of a Manchester receiver is depicted. A twisted pair cable 710 is coupled to receive circuitry (analog) 720 having an analog to digital converter and a data slicer. The receive circuitry 720 sends a digital signal 730 to a Manchester receiver state machine 740. The Manchester receiver state machine 740 includes clock recovery circuitry; data clocking circuitry; and silence detection circuitry. The Manchester receiver state machine 740 includes a data output 750, a clock output 760 and a silence indication output 770.

Circuitry (analog) is provided to interface with the twisted pair cable. The output of this block will be a digital signal representative of the "square-wave-like" waveform of the received Manchester-encoded signal, as exemplified in FIG. 4, above, and also in FIG. 8.

Figure 8:
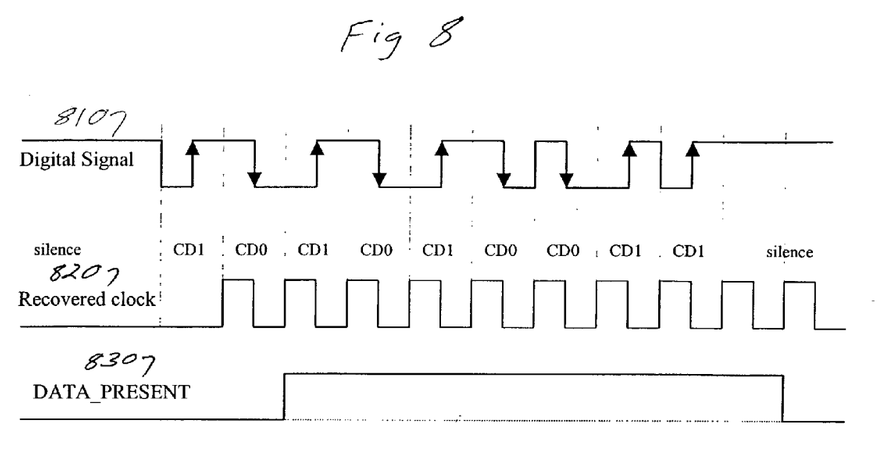
FIG. 8 illustrates a Manchester-encoded signal, associated recovered clock and data present indication, representing an embodiment of the invention.

Referring to FIG. 8, a Manchester-encoded signal 810 and associated (recovered) clock 820 and silence indication 830 (actually "data present") are depicted. Some comments regarding FIG. 8 are in order. First is that the transition from silence to "ACTIVE" (opposite of "SILENCE") cannot be detected instantaneously. Second, is that the transition from ACTIVE to SILENCE cannot be detected instantaneously either. Consequently we have shown a signal called "DATA_PRESENT" in place of ACTIVE or SILENCE and this signal is asserted after a few Manchester transitions have been detected (in FIG. 8 we show the signal assertion occurs after two clocked bits). Similarly, the deassertion of this signal is shown after detection of the absence of the mid-bit transition that would be present if there was a clocked data bit and thus occurs one bit "late". Nevertheless, it is clear that conventional Manchester data recovery circuits can provide a recovered clock signal together with an indication signal that is asserted when the recovered clock signal is "VALID" (or "DATA_PRESENT") and further, this latter indication may be incorrect for the last one or two clock cycles.

PLL Requirement

Conventional phase-locked-loop (PLL) circuits provide the mechanism for "locking" a local oscillator (a voltage controlled oscillator, "VCO", or a voltage controlled crystal oscillator, "VCXO") to a reference clock input signal. However, most conventional PLL circuits are designed to operate in situations wherein the reference input is continuously available. Phase-locked-loop circuits are used even in cases where just frequency lock is acceptable.

In the current situation, the reference clock input is not continuously available and, furthermore, for time-base applications, frequency lock suffices. Circuits that achieve such behavior are not unknown. For example, such a requirement arises in television receivers. If one examines these circuits, it is clear that the underlying principle is often phase lock and thus we will loosely refer to all such circuits as phase-locked-loops, or PLLs.

In many Symmetricom products, PLLs are incorporated to discipline a (stable) local oscillator to a reference input (phase lock or frequency lock, depending on the application); if the reference is lost for any reason, the oscillator is allowed to "fly-wheel". That is, the frequency control input to the VCXO (or VCO) is held constant at the last valid value prior to losing the reference. The term "holdover" is used to describe the operation of the PLL (or FLL). Note that PLL with holdover is exactly the kind of operation we wish to implement in the current situation where the reference is not available continuously but only during data transmission bursts.

Another situation similar to the "gated reference" that we are dealing with here has been addressed in Symmetricom products. When a PLL has multiple reference inputs, it must lock onto one and, in the event that reference input fails, switch to a different reference input (that has been qualified as good). This switchover takes some time and during this interval, the PLL is, effectively free-running ("fly-wheel" or "holdover"). Again, this kind of operation is analogous to the current situation where the reference is not continuously available.

Timing Recovery Variations

In the previous section we indicated how circuit blocks that are currently deployed in various equipments could be used, albeit with minor modifications, to achieve the objective of timing recovery and disciplining of a local oscillator (i.e. a PLL) to extract the time-base information in an Ethernet receiver (i.e. a Manchester decoder) that was inserted by an Ethernet transmitter (i.e. a Manchester encoder). One of the key points was the observation that Ethernet transmissions occur in bursts and thus the recovered clock serves as a reference only when data is being transmitted and the subsequent PLL architecture must take this into account.

Two methods are described below which simplify the constraints on the PLL. In particular, the methods extract clock and do the "fill-in" function during periods of silence. As a consequence, the actual PLL circuitry sees a continuous reference even though the reference input is, strictly speaking, "valid" during the transmission burst and is an "estimate" during periods of silence.

Both methods are variations of methods described in U.S. patent application Ser. No. 09/749,249, filed Dec. 26, 2000 entitled "Clock Recovery and Detection of Rapid Phase Transients" (as well as U.S. Patent Application Ser. No. 60/173,232, filed Dec. 28, 1999).

Timing Recovery Variation A

U.S. patent application Ser. No. 09/749,249, filed Dec. 26, 2000 entitled "Clock Recovery and Detection of Rapid Phase Transients" (as well as U.S. Patent Application Ser. No. 60/173,232, filed Dec. 28, 1999) describes methods and circuits for performing clock recovery from DS1 (aka T1) signals. Several methods are discussed therein.

As background, a DS1 signal comprises a bit-stream with a "1" encoded as a pulse and "0" encoded by the absence of a pulse. Appropriate interface circuitry can convert the input signal on the cable into a digital signal (square-wave like waveform) (referred to a "T1_SIG" in U.S. patent application Ser. No. 09/749,249, filed Dec. 26, 2000 entitled "Clock Recovery and Detection of Rapid Phase Transients" (as well as U.S. Patent Application Ser. No. 60/173,232, filed Dec. 28, 1999)) that has a rising edge for every "1". Nominally, a clock signal would have a rising edge for every transmitted bit. A "clock recovery circuit" thereby generates a signal that has a rising edge for every "1" and inserts a rising edge for every "0". If the DS1 data comprised an "all-1s" signal then T1-SIG would appear as a regular clock waveform with frequency 1.544 MHz (the underlying frequency of DS1 transmission). A section of DS1 data comprised of "0s" would appear as a constant (low) signal and the clock recovery mechanism would insert edges corresponding to its estimate of each bit position.

The applicability of the clock recovery method to the current situation of extracting time-base from a Manchester encoded input signal should now be clear. The conventional scheme for clock recovery in a Manchester decoder can provide a recovered-clock signal during the data burst which is equivalent to T1-SIG for an all-1s DS1 stream; during periods of silence, the Manchester-recovered-clock (always low) appears as a section of T1-SIG corresponding to an all-0s DS1 stream. The (modified) DS1-clock-recovery mechanism would insert edges during periods of silence and use the recovered-clock edges during data transmission (bursts). In U.S. patent application Ser. No. 09/749,249, filed Dec. 26, 2000 entitled "Clock Recovery and Detection of Rapid Phase Transients" (as well as U.S. Patent Application Ser. No. 60/173,232, filed Dec. 28, 1999), clock recovery methods using NCOs (Numerically Controlled Oscillators) are described. They operate using a local clock oscillator of, typically, 30 MHz (a wide range of frequencies can be designed for) which is sufficiently greater than the 1.544 MHz of the underlying DS1 signal to provide good jitter performance. In the Ethernet (10BaseT) application, a local clock oscillator frequency in excess of 50 MHz is desirable. Designs of NCOs inside FPGAs (Field Programmable Gate Arrays) using clock frequencies of 155.52 MHz have been demonstrated. The clock recovery method depicted in FIG. 6 of U.S. patent application Ser. No. 09/749,249, filed Dec. 26, 2000 entitled "Clock Recovery and Detection of Rapid Phase Transients" is especially suitable for deployment in the Ethernet case because it has the best performance during periods of silence.

Timing Recovery Variation B

So far we have considered timing recovery using the (existing) Manchester decoders to provide the recovered clock (during data transmission bursts). It may so transpire that existing, commercially available, Ethernet chips (integrated circuits) may not provide this signal and we have to extract the required time-base based on circuitry external to the Ethernet integrated circuit(s).

This can be achieved in the following manner. Conventional (analog) circuitry with the appropriate data slicing converts the incoming signal into a digital signal (see FIG. 7) in the same manner as a conventional Manchester receiver. This signal, together with the local clock oscillator (155.52 MHz, just for example), is used to generate a pulse train that comprises short pulses with rising edges occurring for each transition (high-to-low or low-to-high) of the recovered digital signal. These pulses, when they occur, occur on 20 MHz boundaries. During Ethernet data transmission bursts, this pulse train then resembles T1-SIG albeit with an underlying frequency of 20 MHz; during silence intervals the pulse train appears as T1-SIG corresponding to an all-0 bit-stream. The clock recovery mechanisms described U.S. patent application Ser. No. 09/749,249, filed Dec. 26, 2000 entitled "Clock Recovery and Detection of Rapid Phase Transients" (as well as U.S. Patent Application Ser. No. 60/173,232, filed Dec. 28, 1999) can be used to extract a (20 MHz) clock from this pulse train. Note that the methods rely only on the rising edge of the pulse train which is linked to the actual Ethernet signal and not the falling edge which is in all likelihood determined by the local (155.52 MHz, in the current example) oscillator.

Figure 9:
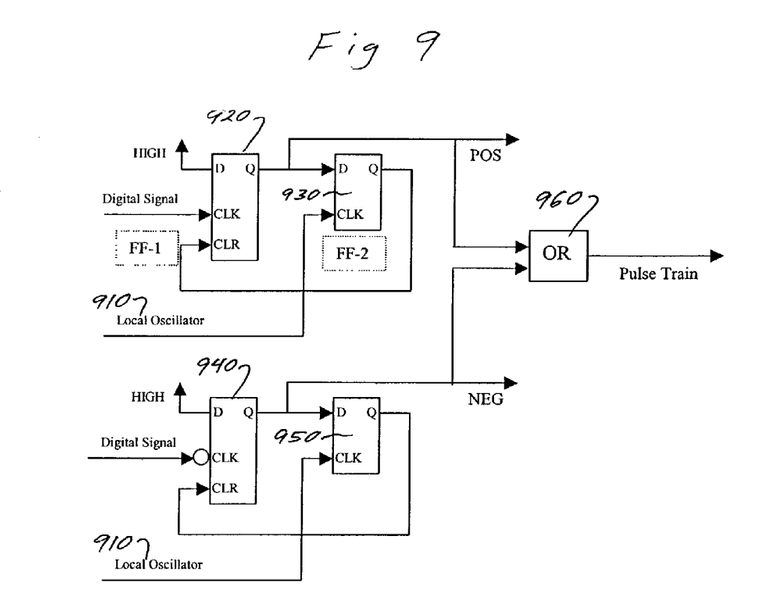
FIG. 9 illustrates a block schematic view of a circuit to generate a pulse train from a Manchester encoded data stream, representing an embodiment of the invention.

Referring to FIG. 9, a circuit that can generate a pulse train from a Manchester encoded data stream is depicted. The circuit is coupled to a local oscillator signal 910, wherein the clock recovery circuit includes a pulse train generator having a first circuit 920 that is clocked high by a rising edge of a digital signal, a second circuit 930 coupled to the first circuit 920 and the local oscillator, a third circuit 940 that is clocked high by a falling edge of the digital signal, a fourth circuit 950 coupled to the third circuit and the local oscillator and an OR circuit 960 coupled to both the first circuit 920 and the third circuit 940.

Generation of the pulse train can be accomplished using a digital circuit of the form depicted in FIG. 9, the operation of which is described here. A rising edge of the digital signal clocks a "1" (HIGH) into the flip-flop designated FF-1. This HIGH signal is then clocked into FF-2 by the local oscillator. A HIGH at the output of FF-2 then clears FF-1. Consequently, the signal "POS" comprises a pulse whose rising edge is tied to a rising edge of the digital signal and whose trailing edge is determined by the next rising edge of the local oscillator. The pulse width is thus between 0 and the clock period of the local oscillator. The scheme can be made more robust by replacing FF-2 with a 2-bit shift register and this would make the POS pulse width between 1 and 2 periods of the local oscillator (the length of the shift register determines the width of the pulse). It is important that the pulse width be less than 50 nsec (the time period of the underlying frequency of the digital signal which, considering all transitions, is 120 MHz in our example). Similarly, the signal "NEG" comprises a pulse for each falling edge of the digital signal. The OR function combines POS and NEG to give the pulse train.

As mentioned before, this pulse train is used as "T1-SIG" for a clock recovery circuit such as one described in U.S. patent application Ser. No. 09/749,249, filed Dec. 26, 2000 entitled "Clock Recovery and Detection of Rapid Phase Transients" (as well as U.S. Patent Application Ser. No. 60/173,232, filed Dec. 28, 1999).

Applications

We have described a methodology whereby every node in a LAN is provided with a time-base traceable to the Level-0 node within the LAN. The Level-0 node can be provided a time-base that is traceable to an absolute time reference such as GPS or UTC either using Symmetricom equipment or via the WAN connection. As a consequence, every node in every network (equipped with this method) can be considered to have an equivalent time-base (plesiochronous operation). The implications thereof are far-reaching and numerous applications can be developed to take advantage of this plesiochronous condition. We describe one such application here.

Measurement of Time-Delay Variation

One of the drawbacks of using packet-switched means for carrying time-sensitive traffic such as voice (speech) or video (moving pictures) is the uncertainty of Quality of Service (QOS). Whereas QOS is a descriptor of quality encompassing several attributes, one of the more important considerations is time-delay and time-delay variation. Time delay is representative of the transmission time of a packet as it traverses from an originating node, across the "cloud" to the terminating node. For real-time applications like speech, it is advantageous to keep this delay as small as possible. A gating item for time delay is time delay variation, representative of the difference in time of transmission between two consecutive packets. If the time-delay variation is large, then large buffers are required to maintain an orderly flow of real-time information (e.g. speech or streaming video) to the consumer of such information (typically a human). Large buffers exacerbate the overall time delay by putting a lower limit on this quantity. Measurement of time-delay variation is thus a useful tool in determining the size of buffers required and, presumably, the minimum buffer depth can be deployed.

The measurement of time-delay variation has been described in an ATM environment in U.S. patent application Ser. No. 09/993,302, filed Nov. 14, 2001 entitled "Measurement of Time-Delay, Time-Delay-Variation, and Cell Transfer Rate in ATM Networks" (as well as U.S. Patent Application Ser. No. 60/272,413, filed Feb. 28, 2001) which are incorporated by reference. In U.S. patent application Ser. No. 09/993,302, filed Nov. 14, 2001 entitled "Measurement of Time-Delay, Time-Delay-Variation, and Cell Transfer Rate in ATM Networks" (as well as U.S. Patent Application Ser. No. 60/272,413, filed Feb. 28, 2001), methods for measuring time-delay variation are described for an ATM environment. The method described there involves sending special ATM cells, called TDV cells, which are sequentially numbered and include a time-stamp representative of the time of transmission. Also included in the TDV cell is the sequence number and time-stamp representative of the time of reception. By accumulating this time-stamp data, the nodes can create a histogram of the time-delay variation and ascertain statistics such as the mean, variance and maximum time-delay variation. If the end-point nodes have a source of absolute time, then actual time-delay through the network can be measured.

Adapting this scheme to packet (IP) architectures is straightforward. Special TDV packets are used (the packet equivalent of TDV cells used in the ATM environment) but other than that the method for ATM translates directly to that for an IP (Internet Protocol, or packet) environment.

Ethernet Extensions

Recognizing that time-base extraction from a received Ethernet signal is "valid" during a transmission burst and "estimated" during silence ("holdover" or "fly-wheel"), it is advantageous if the periods of silence are kept to a minimum. If there is a high level of traffic on the LAN, the periods of silence will automatically be short. Methods to keep silence periods short during times of low traffic need to be addressed. The simplest technique is to use a preamble of greater than 56 bits (the minimum specified by IEEE Std 802.3). Thus when a transmission burst has ended and a period of silence following the burst observed, the preamble of the next burst can be started. This serves two purposes. One is that periods of silence are minimized, and the second that the line looks "alive" even when no information data is being transmitted.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

All the disclosed embodiments of the invention disclosed herein can be made and used without undue experimentation in light of the disclosure. The invention is not limited by theoretical statements recited herein. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

Further, the individual components need not be combined in the disclosed configurations, but could be combined in virtually all configurations. Further, variation may be made in the steps or in the sequence of steps composing methods described herein. Further, although the insertion and/or extraction modules described herein can be separate modules, it will be manifest that the insertion and/or extraction modules may be integrated into the system with which they are associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising inserting network synchronization timing into a data transmission burst including receiving the data transmission burst from a designated node that is coupled to a wide area network, establishing a time based clock signal using a voltage controlled oscillator having as an input a central reference signal supplied to all nodes of the wide area network, providing the time based clock signal to a Manchester encoder in the node which also receives the data transmission burst, encoding data using a time-base reference signal governed clock, wherein the time-base reference signal includes network synchronization timing extracted from the data transmission burst by recovering a clock during the data transmission burst; and then holding over the clock after the data transmission burst ceases based on the time based clock signal from the voltage controlled oscillator.

2. The method of claim 1, wherein the time-base reference signal includes network synchronization timing extracted from one member selected from the group consisting of a primary source and a back-up source.

3. The method of claim 1, wherein the time-base reference signal includes network synchronization timing extracted from a reduced set of references selected from a set of available references from which references that are out of tolerance have been disqualified.

4. The method of claim 1, wherein the time-base reference signal includes an output from an independent reference and the independent reference includes at least one source selected from the group consisting of a global positioning system and a code division multiple access system.

5. An apparatus, comprising:
    a receive circuit receiving a data transmission burst from a designated node that is coupled to a wide area network;
    a Manchester decoder state machine coupled to the receive circuitry, the Manchester decoder state machine including a clock recovery circuit for recovering timing information from the data transmission burst, wherein the Manchester decoder state machine includes a silence detection circuit that generates a data present signal that controls hold over of a time-base reference signal clock; and;
    wherein the clock recovery circuit includes a local oscillator and a pulse train generator having a first circuit, a second circuit that is clocked high by a falling edge of the digital signal, a third circuit coupled to the second circuit and the local oscillator, and an OR circuit coupled to both the first circuit and the second circuit.

6. The apparatus of claim 5, wherein the first circuit includes a 2-bit shift register and the second circuit includes another 2-bit shift register.

7. The apparatus of claim 5, further comprising a twisted pair cable coupled to the receive circuitry, wherein the receive circuitry includes an analog to digital converter.

8. An integrated circuit, comprising the apparatus of claim 5.

9. A circuit board, comprising the integrated circuit of claim 8.

10. A network, comprising the circuit board of claim 9.

11. A computer readable medium having stored thereon a plurality of instructions, the plurality of instructions including instructions which, when extracted by a processor, cause the processor to perform the steps comprising inserting network synchronization timing into a data transmission burst including receiving the data transmission burst from a designated node that is coupled to a wide area network, establishing a time based clock signal using a voltage controlled oscillator having as an input a central reference signal supplied to all nodes of the wide area network, providing the time based clock signal to a Manchester encoder in the node which also receives the data transmission burst, encoding data using a time-base reference signal governed clock, wherein the time-base reference signal includes network synchronization timing extracted from the data transmission burst by recovering a clock during the data transmission burst; and then holding over the clock after the data transmission burst ceases based on the time based clock signal from the voltage controlled oscillator.

12. The computer-readable medium of claim 11, wherein the time-base reference signal includes network synchronization timing extracted from one member selected from the group consisting of a primary source and a back-up source.

13. The computer-readable medium of claim 11, wherein the time-base reference signal includes network synchronization timing extracted from a reduced set of references selected from a set of available references from which references that are out of tolerance have been disqualified.

14. The computer-readable medium of claim 11, wherein the time-base reference signal includes an output from an independent reference and the independent reference includes at least one source selected from the group consisting of a global positioning system and a code division multiple access system.

* * * * *